(12) United States Patent
Kainuma

(10) Patent No.: US 12,327,162 B2
(45) Date of Patent: Jun. 10, 2025

(54) DETERMINATION METHOD, DETERMINATION APPARATUS, COMMUNICATION SYSTEM, AND PROGRAM

(71) Applicants: Norio Ichihashi, Fujisawa (JP); Kenichi Kainuma, Tokyo (JP)

(72) Inventor: Kenichi Kainuma, Tokyo (JP)

(73) Assignees: Norio Ichihashi, Fujisawa (JP); Kenichi Kainuma, Tokyo (JP)

( * ) Notice: Subject to any disclaimer, the term of this patent is extended or adjusted under 35 U.S.C. 154(b) by 12 days.

(21) Appl. No.: 18/275,353

(22) PCT Filed: Feb. 8, 2022

(86) PCT No.: PCT/JP2022/004860
§ 371 (c)(1),
(2) Date: Aug. 1, 2023

(87) PCT Pub. No.: WO2022/176704
PCT Pub. Date: Aug. 25, 2022

(65) Prior Publication Data
US 2024/0127016 A1    Apr. 18, 2024

(30) Foreign Application Priority Data

Feb. 18, 2021   (JP) .................................. 2021-023944

(51) Int. Cl.
*G06K 7/14*    (2006.01)
*G06F 16/9032*    (2019.01)
(Continued)

(52) U.S. Cl.
CPC ....... *G06K 7/1417* (2013.01); *G06F 16/9032* (2019.01); *G06F 16/955* (2019.01); *G06F 21/6218* (2013.01)

(58) Field of Classification Search
CPC .......... G06K 7/1417; G06K 19/06037; G06K 19/06046; G06F 16/9032; G06F 16/955;
(Continued)

(56) References Cited

U.S. PATENT DOCUMENTS

2011/0231316 A1*   9/2011   Carroll, III ............ G06Q 20/40
                                                           705/318
2015/0302421 A1    10/2015  Caton
(Continued)

FOREIGN PATENT DOCUMENTS

JP    2007-049584 A    2/2007
JP    2013-235540 A    11/2013
(Continued)

OTHER PUBLICATIONS

Extended European Search Report for European Patent Application No. 22756025.7 issued Mar. 13, 2024 (8 sheets).
(Continued)

*Primary Examiner* — Jamara A Franklin
(74) *Attorney, Agent, or Firm* — Kratz, Quintos & Hanson, LLP

(57) ABSTRACT

To make it possible to determine authenticity of a two-dimensional code used for guidance to various kinds of websites, advertisement, or authentication or the like. A terminal apparatus 10 acquires a first two-dimensional code to be a determination target and a plurality of pieces of first additional information for determining authenticity of the first two-dimensional code. A server apparatus 30 that communicates with the terminal apparatus 10 via a communication network 20 includes a database DB in which a plurality of pieces of second additional information are registered in advance in association with identification information corresponding to a two-dimensional code guaranteed to be authentic. The terminal apparatus 10 determines the (Continued)

authenticity of the first two-dimensional code by determining whether the plurality of pieces of first additional information are registered in the database DB.

16 Claims, 2 Drawing Sheets

(51) Int. Cl.
*G06F 16/955* (2019.01)
*G06F 21/62* (2013.01)

(58) Field of Classification Search
CPC ............ G06F 21/6218; G06F 16/9554; G06F 16/901; G06F 16/9038; G06Q 30/0609; G06Q 30/018; G06Q 20/38; G16Y 20/20; G16Y 40/20
See application file for complete search history.

(56) References Cited

U.S. PATENT DOCUMENTS

| 2016/0027042 | A1 | 1/2016 | Heeter |
| 2020/0074129 | A1 | 3/2020 | Shen |

FOREIGN PATENT DOCUMENTS

| JP | 2014-197371 A | 10/2014 |
| JP | 2015-95020 A | 5/2015 |
| JP | 2020-516092 A | 5/2020 |

OTHER PUBLICATIONS

International Search Report for International Application No. PCT/JP2022/004860 dated May 17, 2022 (2 sheets).

* cited by examiner

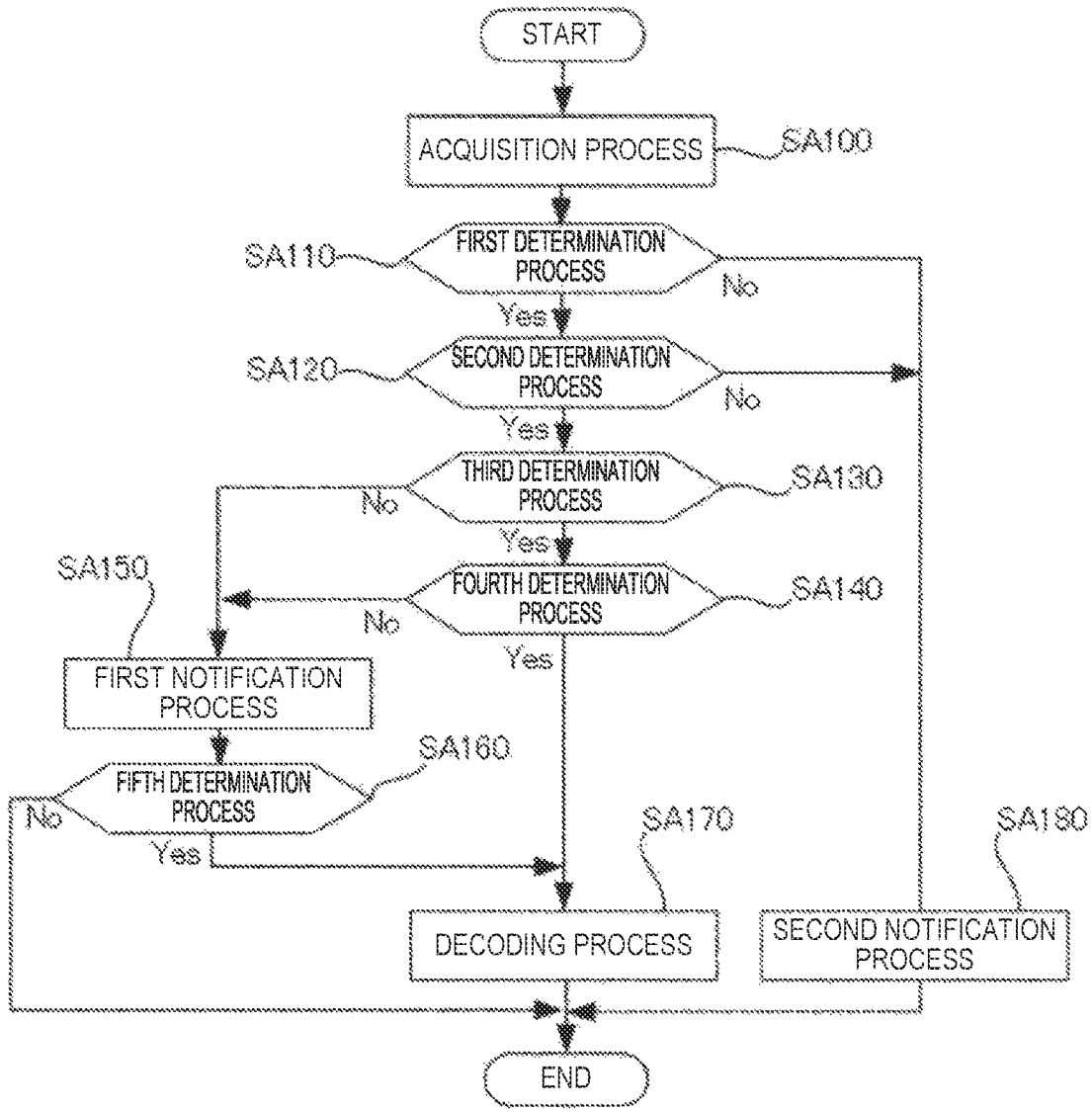
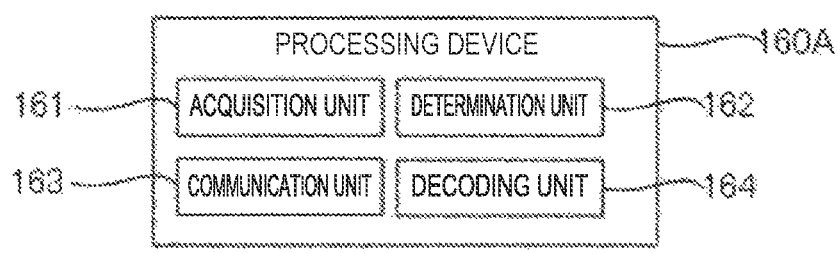

DETERMINATION METHOD, DETERMINATION APPARATUS, COMMUNICATION SYSTEM, AND PROGRAM

TECHNICAL FIELD

The present disclosure relates to a determination method, a determination apparatus, a communication system, and a program.

BACKGROUND ART

Recently, two-dimensional codes such as a QR (quick response) code (registered trademark) have been used for provision of detailed information about a product or the like (specifications, manufacturer, selling agency, and the like of the product), for authentication, or for guidance to various types of websites. For example, in a case where a QR code (registered trademark) obtained by encoding detailed information about a product or the like is provided on a magazine or the like together with an image of the product, a reader of the magazine acquires the detailed information about the product by picking up an image of the QR code (registered trademark) with a camera of a smartphone and causing the smartphone to decode the QR code (registered trademark) the image of which has been picked up. As an example of a related art technique regarding this type of two-dimensional code, a technique disclosed in Patent Literature 1 is given. In Patent Literature 1, a technique for improving design of a two-dimensional code is disclosed.

CITATION LIST

Patent Literature

Patent Literature 1: Japanese Patent Laid-Open No. 2015-95020

SUMMARY OF INVENTION

Technical Problem

In the case of using a two-dimensional code for payment of a product at a vending machine, it is conceivable to attach, to the vending machine or the like, a printed matter of the two-dimensional code (hereinafter, a code print) for guidance to a payment site. When the code print is replaced with a fake print (a printed matter of a two-dimensional code for guidance to a fake payment site), however, a user of the vending machine cannot determine authenticity of the two-dimensional code from the external appearance of the two-dimensional code, and the user accesses the fake payment site and may suffer an unexpected disadvantage.

A barcode is similar in that a user cannot determine authenticity thereof from its external appearance. This is because a barcode is the same as a two-dimensional code in that it is data obtained by encoding information according to a predetermined rule (that is, such data that the encoded information is difficult for a person to recognize from the external appearance). Further, for an URL (uniform resource locator), a similar problem can occur. A URL is a communication address of a partner apparatus to be a communication partner and a communication protocol used for communication with the partner apparatus that are represented by a character string (a character string representing a domain name) that is easily recognized by a person, and is different from a barcode and a two-dimensional code in that point. However, when an authentic URL and a fake URL are confusingly similar in external appearance, like in a case where an authentic URL is "https://www.aabbcc.com" and a fake URL is "https://www.aabbdb.com", a user might accidentally access the fake URL instead of the authentic URL, and suffer an unexpected disadvantage.

The present disclosure has been made in view of the above situation, and an object is to provide a technique making it possible to determine authenticity of data such as a two-dimensional code, a barcode, an URL and the like.

Solution to Problem

One aspect of a determination method of the present disclosure includes: an acquisition step of acquiring first data to be an authenticity determination target and one or more pieces of first additional information for determining authenticity of the first data; and a determination step of determining the authenticity of the first data by determining whether the one or more pieces of first additional information are registered in a database in which one or more pieces of second additional information are registered in advance in association with identification information corresponding to data guaranteed to be authentic.

In the determination method of a more preferable aspect, the first data is data obtained by encoding information according to a predetermined rule and is, further preferably, a barcode or a two-dimensional code. In the determination method of another aspect, the first data is data of a communication address and a communication protocol used for communication with a partner apparatus indicated by the communication address that is represented by a character string that is easily recognized by a person and is, further preferably, a URL.

In the determination method of a more preferable aspect, at the acquisition step, the first data is acquired through image pickup using an image pickup apparatus. Further, the one or more pieces of first additional information include a first image picked up together with the first data. The one or more pieces of second additional information include a second image that is to be picked up together with the data corresponding to the identification information registered in the database in association with the one or more pieces of second additional information.

In the determination method of a further preferable aspect, a first logo representing a provider of information obtained by decoding the first data is embedded in the first data; and the first image includes an image of the first logo. Further, the second image includes an image of a second logo representing a provider of information obtained by decoding the data corresponding to the identification information registered in the database in association with the one or more pieces of second additional information.

In the determination method of a further preferable aspect, the first image includes an image of a background of a picked-up image of the first data. Further, the second image includes an image of a background that is to be captured at time of picking up an image of the data corresponding to the identification information registered in the database in association with the one or more pieces of second additional information.

In the determination method of a further preferable aspect, the one or more pieces of first additional information include information indicating a position at time of having acquired the first data. Further, the one or more pieces of second additional information include information indicating a position where the data corresponding to the identification information registered in the database in association with the one or more pieces of second additional information is to be acquired.

In the determination method of a further preferable aspect, the one or more pieces of first additional information include information indicating a radio signal received at a position at time of having acquired the first data. Further, the one or more pieces of second additional information include information indicating a radio signal received at a position where the data corresponding to the identification information registered in the database in association with the one or more pieces of second additional information is to be acquired.

In the determination method of a further preferable aspect, the one or more pieces of first additional information include information indicating a sound picked up at a position at time of having acquired the first data. Further, the one or more pieces of second additional information include information indicating a sound picked up at a position where the data corresponding to the identification information registered in the database in association with the one or more pieces of second additional information is to be acquired.

One aspect of a determination apparatus of the present disclosure includes: an acquisition unit acquiring first data to be an authenticity determination target and one or more pieces of first additional information for determining authenticity of the first data; and a determination unit determining the authenticity of the first data by determining whether the one or more pieces of first additional information are registered in a database in which one or more pieces of second additional information are registered in advance in association with identification information corresponding to data guaranteed to be authentic.

One aspect of a communication system of the present disclosure includes: a terminal apparatus and a server apparatus communicating with the terminal apparatus via a communication network. The server apparatus includes a database. The terminal apparatus includes: an acquisition unit acquiring first data to be an authenticity determination target and one or more pieces of first additional information for determining authenticity of the first data; and a determination unit determining the authenticity of the first data by determining whether the one or more pieces of first additional information are registered in the database. One or more pieces of second additional information are registered in the database in advance in association with identification information corresponding to data guaranteed to be authentic.

One aspect of a program of the present disclosure causes a computer to execute: an acquisition step of acquiring first data to be an authenticity determination target and one or more pieces of first additional information for determining authenticity of the first data; and a determination step of determining the authenticity of the first data by determining whether the one or more pieces of first additional information are registered in a database in which one or more pieces of second additional information are registered in advance in association with identification information corresponding to data guaranteed to be authentic.

BRIEF DESCRIPTION OF DRAWINGS

FIG. 3 is a flowchart showing a flow of a determination method of the present embodiment.

FIG. 4 is a diagram showing a configuration example of a processing apparatus 160A according to a modification (4).

DESCRIPTION OF EMBODIMENT

An embodiment of the present disclosure will be described below with reference to drawings. Various restrictions that are technically favorable are imposed on the embodiment described below. Embodiments of the present disclosure, however, are not limited to the embodiment described below.

A: Embodiment

Figure 1:
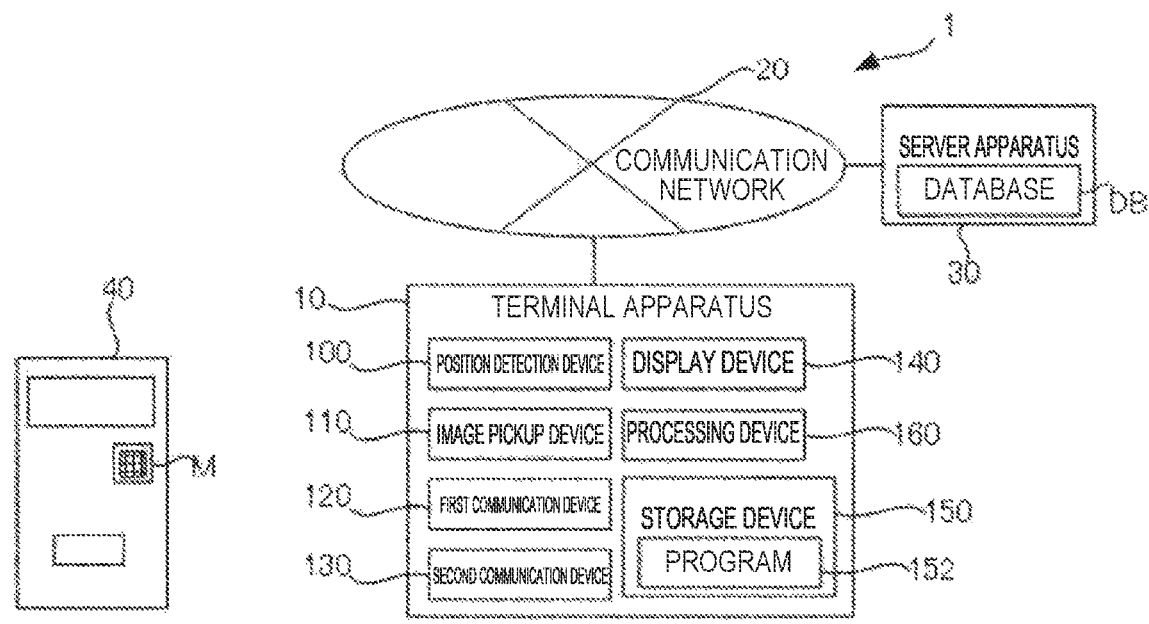
FIG. 1 is a diagram showing a configuration example of a terminal apparatus 10 that executes a determination method according to an embodiment of the present disclosure, and a configuration example of a communication system 1 that includes the terminal apparatus 10.

FIG. 1 is a diagram showing a configuration example of a terminal apparatus 10 that executes a determination method according to an embodiment of the present disclosure, and a configuration example of a communication system 1 that includes the terminal apparatus 10. As shown in FIG. 1, the communication system 1 includes the terminal apparatus 10 and a server apparatus 30 that communicates with the terminal apparatus 10 via a communication network 20. The terminal apparatus 10 determines whether a two-dimensional code used for guidance to a product payment site is authentic or fake, by the determination method of the present disclosure. In the present embodiment, the two-dimensional code to be a determination target is a QR code (registered trademark) for guidance a product purchaser to a site for payment of a product sold by a vending machine 40. The QR code (registered trademark) is an encoded URL (uniform resource locator) of the payment site. To the vending machine 40, a code print M on which the QR code (registered trademark) is printed is attached in advance.

In FIG. 1, the vending machine 40 is shown in addition to the communication system 1. In addition to a product sales function, the vending machine 40 has a communication function of communicating with other apparatuses according to a predetermined short-range wireless communication standard such as Bluetooth (registered trademark). In the present embodiment, in order that authenticity can be determined by the determination method of the present disclosure, the code print M is guaranteed to be authentic by a business operator that operates the server apparatus 30 and is associated with unique identification information (for example, a character string representing a series of numbers) in advance. In the vending machine 40, the identification information corresponding to the two-dimensional code printed on the code print M is stored in advance. The vending machine 40 transmits the identification information to a communication partner apparatus using the communication function.

The terminal apparatus 10 is a mobile terminal provided with an image pickup function, a program execution function, a first communication function, and a second communication function. The first communication function is a function of communicating with other apparatuses via the communication network 20. The second communication function is a function of communicating with other apparatuses by wireless communication in conformity with the short-range wireless communication standard stated before. The terminal apparatus 10 of the present embodiment is, for example, a smartphone. The communication network 20 includes, for example, the Internet and a wireless communication network connected to the Internet. The wireless communication network has base stations (not shown in FIG. 1) that wirelessly communicates with the terminal apparatus 10.

The server apparatus 30 is a database server provided with a database DB. In the database DB, three pieces of additional information are registered in advance in association with the identification information stated before, the three pieces of additional information being used at the time of determining authenticity of a two-dimensional code corresponding to the identification information. The three pieces of additional information registered in the database DB in association with the identification information are an example of a plurality of pieces of second additional information in the present disclosure.

In the present embodiment, a first piece of additional information, among the three pieces of additional information registered in the database DB in association with the identification information, is an image of a logo representing a provider of information obtained by decoding the two-dimensional code corresponding to the identification information (hereinafter, a reference logo image). The logo represented by the reference logo image is an example of a second logo in the present disclosure. A log is also referred to as a logo mark, and a logo mark includes a logotype and/or a symbol mark. A logo type is a character string obtained by ornamentally designing a company name, a product name, a brand name, or the like. A symbol mark is an emblem obtained by designing a philosophy symbolizing a company, a feature of a product, or a tool representing an industry, or the like. In the present embodiment, image data representing an image of a log of a company that operates the vending machine 40 is registered in the database DB in association with the identification information about the vending machine 40, as the additional information indicating a reference logo image.

Figure 2:
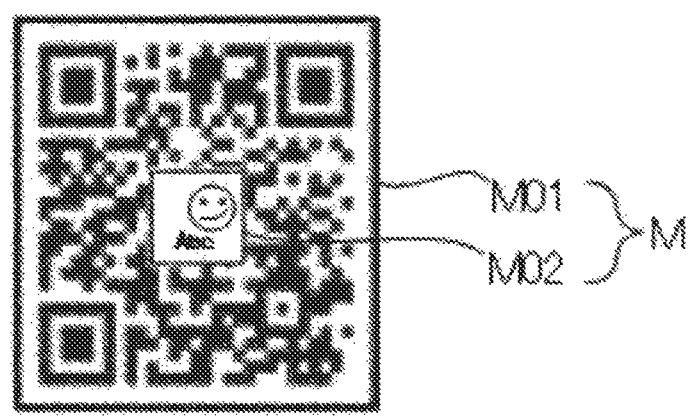
FIG. 2 is a diagram showing an example of a code print M in the present embodiment.

FIG. 2 is a diagram showing an example of a code print M attached to the vending machine 40. As shown in FIG. 2, in the center of a two-dimensional code M01 printed on the code print M, an image M02 of the logo of the company that operates the vending machine 40 is embedded. Therefore, when an image of the two-dimensional code M01 is picked up, the logo image M02 of the logo is acquired at the same time.

A second piece of additional information, among the three pieces of additional information registered in the database DB in association with the identification information, is an image of the background of the two-dimensional code corresponding to the identification information (hereinafter referred to as a reference background image). Therefore, when an image of the two-dimensional code is picked up, the image of the background is acquired at the same time. In the present embodiment, image data representing an image of a part of the case of the vending machine 40 where the code print M is attached is registered in the database DB in association with the identification information about the vending machine 40, as additional information indicating the reference background image. The logo image embedded in the two-dimensional code and the image of the background of the two-dimensional code are an example of a second image that is to be picked up together with the two-dimensional code.

A third piece of additional information, among the three pieces of additional information registered in the database DB in association with the identification information, is information indicating a position where acquisition of the two-dimensional code corresponding to the identification information is to be performed (hereinafter, a reference position). In the present embodiment, information indicating an installation position of the vending machine 40 is registered in the database DB in association with the identification information about the vending machine 40, as additional information indicating the reference position.

As shown in FIG. 1, the terminal apparatus 10 has a position detection device 100, an image pickup device 110, a first communication device 120, a second communication device 130, a display device 140, a storage device 150, and a processing device 160. Since the terminal apparatus 10 is a smartphone, it has an operation input device that accepts an operation by a user and a voice input/output device that inputs/outputs voice, in addition to the components shown in FIG. 1. The operation input device and the voice input/output device are, however, not related to the determination method of the present disclosure so much, they are not shown in FIG. 1.

The position detection device 100 is, for example, a GPS (global positioning system or global positioning satellite) receiver. The position detection device 100 acquires information indicating a position of the terminal apparatus 10 using the GPS. Though the position detection device 100 in the present embodiment acquires information indicating a position of the terminal apparatus 10 using the GPS, a position of the terminal apparatus 10 may be calculated based on information indicating each of a plurality of base stations that accommodates the terminal apparatus 10 in the wireless communication network of the communication network 20 and information indicating a distance from each of the base stations.

The image pickup device 110 is a camera provided with an image pickup device, for example, a CCD (charge-coupled device) image sensor. The image pickup device 110 picks up an image in response to an operation by the user on the operation input device, and outputs image data representing the picked-up image to the processing device 160. In the present embodiment, by picking up an image of the code print M attached to the vending machine 40 by the image pickup device 110, the two-dimensional code to be an authenticity determination target, and two among the three pieces of additional information used to determine authenticity of the two-dimensional code, that is, the logo image and the background image are acquired. The two-dimensional code acquired through image pickup by the image pickup device 110 is an example of a first two-dimensional code in the present disclosure. The logo image obtained by image pickup by the image pickup device 110 is an example of a first logo image in the present disclosure, and the background image obtained by image pickup by the image pickup device 110 is an example of a first background image in the present disclosure. The logo image and the background image are an example of a first image in the present disclosure.

The first communication device 120 is a wireless communication circuit provided with an antenna. The first communication function is realized by the first communication device 120. The first communication device 120 receives data transmitted from the communication network 20 and hands over the received data to the processing device 160. Further, the first communication device 120 transmits data given from the processing device 160 to the communication network 20. The second communication device 130 is a wireless communication circuit that executes wireless communication according to the short-range wireless communication standard stated before. The second communication function is realized by the second communication device 130. The second communication device 130 receives the identification information about the vending machine 40 by communicating with the vending machine 40. The second communication device 130 hands over the received identification information to the processing device 160.

The display device 140 includes, for example, a liquid crystal display and a drive circuit therefor. The display device 140 displays various kinds of images under control by the processing device 160.

The storage device 150 includes a non-volatile memory and a volatile memory. In the non-volatile memory, various kinds of programs are stored in advance. The non-volatile memory is, for example, a flash ROM (read-only memory). As examples of the programs stored in the non-volatile memory, a program 152 shown in FIG. 1 and a browser program that causes the processing device 160 to realize a web browser are given. The program 152 is a program that causes the processing device 160 to execute the determination method of the present disclosure. The volatile memory is, for example, a RAM (random access memory). The volatile memory is used by the processing device 160 as a work area at the time when the various kinds of programs are each executed.

The processing device 160 is a computer, for example, a CPU (central processing unit). The processing device 160 reads out the program 152 from the non-volatile memory onto the volatile memory, being triggered by an operation of instructing to pick up an image of the two-dimensional code by the image pickup device 110 being performed on the operation input device, and starts execution of the read-out program 152. The processing device 160 operating according to the program 152 executes the determination method shown in a flowchart in FIG. 3. As shown in FIG. 3, the determination method of the present disclosure includes an acquisition process SA100, a first determination process SA110, a second determination process SA120, a third determination process SA130, a fourth determination process SA140, a first notification process SA150, a fifth determination process SA160, a decoding process SA170, and a second notification process SA180.

In the acquisition process SA100, the processing device 160 acquires an image of the determination-target two-dimensional code by performing image pickup by the image pickup device 110 and acquires the identification information from the vending machine 40 via the second communication device 130. Hereinafter, the identification information acquired in the acquisition process SA100 may be referred to as "the determination target identification information". Further, in the acquisition process SA100, the processing device 160 acquires the three pieces of additional information for determining authenticity of the determination target two-dimensional code. The three pieces of additional information acquired in the acquisition process SA100 are an example of a plurality of pieces of first additional information in the present disclosure. More specifically, the processing device 160 acquires each of the logo image and the background image from the image picked up by the image pickup device 110, as additional information. Hereinafter, the logo image extracted from the image picked up by the image pickup device 110 may be referred to as "the determination target logo image", and the background image extracted from the picked-up image may be referred to as "the determination target background image". Further, the processing device 160 acquires information indicating a position of the terminal apparatus 10 at the time of being instructed to pick up an image of the determination target two-dimensional code (hereinafter, the determination target position) from the position detection device 100, and causes the information to be the third additional information.

In the first determination process SA110, the processing device 160 communicates with the server apparatus 30 via the first communication device 120 and the communication network 20, and determines whether the determination target identification information is registered in the database DB. As shown in FIG. 3, if a determination result of the first determination process SA110 is "Yes", the processing device 160 executes the second determination process SA120. If the determination result of the first determination process SA110 is "No", the processing device 160 executes the second notification process SA180. In the second notification process SA180, the processing device 160 causes the display device 140 to display an error message notifying the user that determination is impossible. This is because, for a two-dimensional code for which corresponding identification information is not registered in the database DB, it is not possible to determine authenticity thereof. When the execution of the second notification process SA180 is completed, the processing device 160 ends the execution of the present determination method.

In the second determination process SA120 that is executed when the determination result of the first determination process SA110 is "Yes", the processing device 160 communicates with the server apparatus 30 via the first communication device 120 and the communication network 20, and determines whether the additional information indicating a reference position corresponding to the determination target position is registered in the database DB in association with the determination target identification information. The reference position corresponding to the determination target position refers to such a reference position that the determination target position is included within a predetermined range (for example, a range within a radius of 30 cm or the like) with the reference position as the center. As shown in FIG. 3, if a determination result of the second determination process SA120 is "Yes", the processing device 160 executes the third determination process SA130. If the determination result of the second determination process SA120 is "No", the processing device 160 executes the second notification process SA180 and ends the execution of the present determination method. This is because, since it is common that the vending machine 40 to be the authenticity determination target is fixedly installed, it is normally not considered that the determination target two-dimensional code is acquired at a position different from the registered reference position.

In the third determination process SA130 that is executed when the determination result of the second determination process SA120 is "Yes", the processing device 160 communicates with the server apparatus 30 via the first communication device 120 and the communication network 20, and determines whether the additional information indicating a reference logo image corresponding to the determination target logo image is registered in the database DB in association with the determination target identification information. As shown in FIG. 3, if a determination result of the third determination process SA130 is "Yes", the processing device 160 executes the fourth determination process S140. If the determination result of the third determination process SA130 is "No", the processing device 160 executes the first notification process SA150. In the first notification process SA150, the processing device 160 causes the display device 140 to display a warning message showing that the two-dimensional code acquired in the acquisition process SA100 is not necessarily said to be authentic, and asks the user whether to decode the two-dimensional code. The reason why the warning message is outputted when the determination result of the third determination process SA130 is "No" is because it may be determined, depending on the angle at the time of picking up an image of the determination target two-dimensional code, that the determination target logo image and the reference log image do not correspond to each other even if the determination target two-dimensional code is an authentic two-dimensional code.

In the fifth determination process SA160 subsequent to the first notification process SA150, the processing device 160 determines whether an operation of instructing to decode the two-dimensional code has been performed on the operation input device. The processing device 160 may cause the display device 140 to display the determination target logo image and the reference logo image registered in the database DB in association with the determination target identification information side by side, in order that they are referred to at the time of causing the user to determine whether to decode the two-dimensional code. If the operation of instructing to decode the two-dimensional code has been performed, a determination result of the fifth determination process SA160 is "Yes", and, if an operation of instructing not to decode the two-dimensional code has been performed, a determination result of the fifth determination process SA160 is "No". If the determination result of the fifth determination process SA160 is "Yes", the processing device 160 executes the decoding process SA170 for decoding the two-dimensional code acquired in the acquisition process SA100, and ends the execution of the present determination method. After that, the processing device 160 starts the browser program with the URL decoded in the decoding process SA170 as a startup argument to access the payment site indicated by the URL. In comparison, if the determination result of the fifth determination process SA160 is "No", the processing device 160 ends the execution of the present determination method without executing the decoding process SA170.

In the fourth determination process SA140 that is executed when the determination result of the third determination process SA130 is "Yes", the processing device 160 communicates with the server apparatus 30 via the first communication device 120 and the communication network 20, and determines whether the additional information indicating a reference background image corresponding to the determination target background image is registered in the database DB in association with the determination target identification information. If the determination result of the fourth determination process SA140 is "No", the processing device 160 executes the first notification process SA150 and subsequent processes. This is because it may be determined, depending on the angle at the time of picking up an image of the determination target two-dimensional code, that the determination target background image and the reference background image do not correspond to each other even if the determination target two-dimensional code, is an authentic two-dimensional code. In comparison, if the determination result of the fourth determination process SA140 is "Yes", the processing device 160 executes the decoding process SA170.

As described above, according to the present embodiment, it becomes possible to determine authenticity of a two-dimensional code based on three pieces of additional information acquired together with the two-dimensional code. If a position of acquiring the two-dimensional code is not included in a predetermined range with a reference position as the center, it is determined that determination about the two-dimensional code is impossible, and the two-dimensional code is not decoded. Further, if at least one of a logo image and a background image acquired together with an image of the two-dimensional code is not registered in the server apparatus 30, a warning message showing that the acquired two-dimensional code is not necessarily said to be authentic is outputted, it is warned to be careful about decoding of the two-dimensional code that is not necessarily said to be authentic from the logo image or the background image. If the code print M on the vending machine 40 is replaced with a fake, and the two-dimensional code is not determined to be authentic based on the logo or the background, a user of the vending machine 40 is warned to be careful. Therefore, it is possible to prevent the user from carelessly accessing a fake payment site. Though the fourth determination process SA140 is executed when the determination result of the third determination process SA130 is "Yes" in the above embodiment, the third determination process SA130 and the fourth determination process SA140 may be exchanged in execution order. Specifically, the fourth determination process SA140 may be executed when the determination result of the second determination process SA120 is "Yes", and the third determination process SA130 may be executed when the determination result of the fourth determination process SA140 is "Yes". Further, when the determination result of the third determination process SA130 is "No" or when the determination result of the fourth determination process SA140 is "No", the processing device 160 may execute the second notification process SA180 and end the execution of the determination method.

B: Modifications

An embodiment of the present invention has been described above. The following modifications may be added to the embodiment.

(1) The terminal apparatus 10 or the server apparatus 30 may be manufactured or sold as a single item. The server apparatus 30 may be realized not by a single apparatus but by cooperation among a plurality of computers such as a cloud service and the like.

(3) Though the program 152 is installed in advance in the terminal apparatus 10 of the above embodiment, the program 152 may be distributed in a state of being written in a computer-readable storage medium such as a memory stick or may be distributed by download via the communication network 20. By causing a general computer to operate according to the program 152 distributed as above, the computer can execute the determination method of the present disclosure.

(4) The processing device 160 in the above embodiment is a CPU. The processing device 160, however, may be replaced with a processing device 160A configured by combining an acquisition unit 161, a determination unit 162, a communication unit 163, and a decoding unit 164 shown in FIG. 4. Each of the acquisition unit 161, the determination unit 162, the communication unit 163, and the decoding unit 164 in FIG. 4 may be configured with an electronic circuit such as an ASIC (application specific integrated circuit). The acquisition unit 161 executes the acquisition process SA100. The determination unit 162 executes the first determination process SA110, the second determination process SA120, the third determination process SA130, the fourth determination process SA140, and the fifth determination process SA160. The communication unit 163 executes the first notification process SA150 and the second notification process SA180. The decoding unit 164 executes the decoding process SA170. The terminal apparatus 10 in which the processing device 160 is replaced with the processing device 160A also has the same effects as the above embodiment.

(5) Though the database DB is stored in the server apparatus 30 in the above embodiment, the database DB may be stored in the storage device 150 of the terminal apparatus 10. Further, though the processing device 160 of the terminal apparatus 10 executes the determination method of the present disclosure in the above embodiment, it is also possible for the processing device 160 of the terminal apparatus 10 to execute the acquisition process SA100 and a process for displaying a message transmitted from the server apparatus 30 and for the server apparatus 30 to execute the first determination process SA110 and subsequent processes.

(6) In the above embodiment, the two-dimensional code printed on the code print M attached to the vending machine 40 is the authenticity determination target. A two-dimensional code for which authenticity is determined by the determination method of the present disclosure, however, may be a two-dimensional code printed in a magazine or the like, or on a web page. In the case of a two-dimensional code printed in a magazine or the like, however, it is not possible to identify in advance a position where the two-dimensional code is to be acquired, and, therefore, additional information indicating a reference position may be omitted. As for a two-dimensional code printed in a magazine or the like, a logo image and/or a background image (an image of a page where the two-dimensional code is printed) is preferable as additional information. The same goes for a two-dimensional code displayed on a web page. In the aspect in which the additional information indicating a reference position is omitted, the position detection device 100 is unnecessary, and the second determination process SA120 is also unnecessary. Further, in a case where it is not possible to identify an image of the background of a two-dimensional code in advance, the additional information indicating a reference background image may be omitted. In this case, the fourth determination process SA140 is unnecessary. That is, though authenticity of a two-dimensional code is determined based on three kinds of pieces of additional information acquired together with the two-dimensional code in the above embodiment, authenticity may be determined based on one or two pieces of additional information. In short, any aspect is possible if authenticity of a two-dimensional code is determined based on one or more pieces of additional information.

Further, additional information for determining authenticity of a two-dimensional code may be information indicating a radio signal received by the first communication device 120 or the second communication device 130 at a position at the time of having acquired the two-dimensional code (information indicating the frequency of the radio signal). In this case, a transmission device that transmits the radio signal is provided in the vending machine 40, and one or more pieces of additional information registered in the database DB in association with identification information about the two-dimensional code are only required to include information indicating the radio signal received by the first communication device 120 or the second communication device 130 at a position where the two-dimensional code is to be acquired. Further, the information may be information indicating a sound picked up by a microphone or the like at the position at the time of having acquired the two-dimensional code (for example, information indicating the frequency of the sound). In this case, a sound emitting device that emits the sound is provided in the vending machine 40, and one or more pieces of additional information registered in the database DB in association with identification information about the two-dimensional code are only required to include information indicating the sound picked up by the microphone or the like at a position where the two-dimensional code is to be acquired.

In the above embodiment, a two-dimensional code obtained by encoding the URL of a payment site is authenticity determination target data. The data for which authenticity is determined by the determination method of the present disclosure, however, may be a two-dimensional code for guidance to a website of a type different from a payment site, or a two-dimensional code for providing detailed information about a product or the like or for authentication. Further, the data for which authenticity is determined by the determination method of the present disclosure is not limited to a two-dimensional code but may be a barcode obtained by encoding the URL of a payment site, a barcode for guidance to a website of a type different from a payment site, or a barcode for providing detailed information about a product or the like or for authentication. That is, the data for which authenticity is determined by the determination method of the present disclosure may be any data that is obtained by encoding information according to rules determined in advance. Further, the data for which authenticity is determined by the determination method of the present disclosure may be the URL of a payment site, the URL of a website of a type different from a payment site, the URL of a website provided with detailed information about a product or the like, or the URL of a website for authentication. When the data for which authenticity is determined by the determination method of the present disclosure is a URL, domain name resolution using the DNS (domain name system) is exemplified as decoding of the data. That is, the data for which authenticity is determined by the determination method of the present disclosure may be data of a communication address and a communication protocol used for communication with a partner apparatus indicated by the communication address that is represented by a character string that is easily recognized by a person.

That is, the determination method of the present disclosure is only required to include the following acquisition step and determination step. The determination step is a step of acquiring first data to be an authenticity determination target and one or more pieces of first additional information for determining authenticity of the first data. The determination step is a step of determining the authenticity of the first two-dimensional code by determining whether a set of the first data and the one or more pieces of first additional information is registered in a database in which one or more pieces of second additional information are registered in advance in association with data guaranteed to be authentic.

Further, the determination apparatus that executes the determination method of the present disclosure may be configured by combining an acquisition unit that executes the acquisition step stated before (for example, the acquisition unit 161 in FIG. 4) and the determination unit that executes the determination step stated before (for example, the determination unit 162 in FIG. 4).

REFERENCE SIGNS LIST 1 communication system
10 terminal apparatus 20 communication network
30 server apparatus
40 vending machine
100 position detection device
110 image pickup device
120 first communication device
130 second communication device
140 display device
150 storage device
152 program
160 processing device
161 acquisition unit
162 determination unit
163 communication unit
164 decoding unit

The invention claimed is:

1. A determination method, comprising:
an acquisition step of acquiring first data to be an authenticity determination target and one or more pieces of first additional information for determining authenticity of the first data; and
a determination step of determining the authenticity of the first data by determining whether the one or more pieces of first additional information are registered in a database in which one or more pieces of second additional information are registered in advance in association with identification information corresponding to data guaranteed to be authentic,
wherein
at the acquisition step, the first data is acquired through image pickup using an image pickup apparatus;
the one or more pieces of first additional information include a first image picked up together with the first data; and
the one or more pieces of second additional information include a second image that is to be picked up together with the data corresponding to the identification information registered in the database in association with the one or more pieces of second additional information.

2. The determination method according to claim 1, wherein
the first data is data obtained by encoding information according to a predetermined rule.

3. The determination method according to claim 2, wherein
the first data is a barcode or a two-dimensional code.

4. The determination method according to claim 1, wherein
the first data is data of a communication address and a communication protocol used for communication with a partner apparatus indicated by the communication address that is represented by a character string that is easily recognized by a person.

5. The determination method according to claim 4, wherein
the first data is a URL (uniform resource locator).

6. The determination method according to claim 1, wherein
a first logo representing a provider of information obtained by decoding the first data is embedded in the first data;
the first image includes an image of the first logo; and
the second image includes an image of a second logo representing a provider of information obtained by decoding the data corresponding to the identification information registered in the database in association with the one or more pieces of second additional information.

7. The determination method according to claim 6, wherein
the first image includes an image of a background of a picked-up image of the first data; and
the second image includes an image of a background that is to be captured at time of picking up an image of the data corresponding to the identification information registered in the database in association with the one or more pieces of second additional information.

8. The determination method according to claim 1, wherein
the one or more pieces of first additional information include information indicating a position at time of having acquired the first data; and
the one or more pieces of second additional information include information indicating a position where the data corresponding to the identification information registered in the database in association with the one or more pieces of second additional information is to be acquired.

9. The determination method according to claim 1, wherein
the one or more pieces of first additional information include information indicating a radio signal received at a position at time of having acquired the first data; and
the one or more pieces of second additional information include information indicating a radio signal received at a position where the data corresponding to the identification information registered in the database in association with the one or more pieces of second additional information is to be acquired.

10. The determination method according to claim 1, wherein
the one or more pieces of first additional information include information indicating a sound picked up at a position at time of having acquired the first data; and
the one or more pieces of second additional information include information indicating a sound picked up at a position where the data corresponding to the identification information registered in the database in association with the one or more pieces of second additional information is to be acquired.

11. A determination apparatus, comprising:
an acquisition apparatus configured to acquire first data to be an authenticity determination target and one or more pieces of first additional information for determining authenticity of the first data; and
a determination apparatus configured to determine the authenticity of the first data by determining whether the one or more pieces of first additional information are registered in a database in which one or more pieces of second additional information are registered in advance in association with identification information corresponding to data guaranteed to be authentic,
wherein
at the acquisition apparatus, the first data is acquired through image pickup using an image pickup apparatus;
the one or more pieces of first additional information include a first image picked up together with the first data; and
the one or more pieces of second additional information include a second image that is to be picked up together with the data corresponding to the identification information registered in the database in association with the one or more pieces of second additional information.

12. The determination apparatus according to claim 11, wherein
   a first logo representing a provider of information obtained by decoding the first data is embedded in the first data;
   the first image includes an image of the first logo; and
   the second image includes an image of a second logo representing a provider of information obtained by decoding the data corresponding to the identification information registered in the database in association with the one or more pieces of second additional information.

13. The determination apparatus according to claim 12, wherein
   the first image includes an image of a background of a picked-up image of the first data; and
   the second image includes an image of a background that is to be captured at time of picking up an image of the data corresponding to the identification information registered in the database in association with the one or more pieces of second additional information.

14. The determination apparatus according to claim 11, wherein
   the one or more pieces of first additional information include information indicating a position at time of having acquired the first data; and
   the one or more pieces of second additional information include information indicating a position where the data corresponding to the identification information registered in the database in association with the one or more pieces of second additional information is to be acquired.

15. The determination apparatus according to claim 11, wherein
   the one or more pieces of first additional information include information indicating a radio signal received at a position at time of having acquired the first data; and
   the one or more pieces of second additional information include information indicating a radio signal received at a position where the data corresponding to the identification information registered in the database in association with the one or more pieces of second additional information is to be acquired.

16. The determination apparatus according to claim 11, wherein
   the one or more pieces of first additional information include information indicating a sound picked up at a position at time of having acquired the first data; and
   the one or more pieces of second additional information include information indicating a sound picked up at a position where the data corresponding to the identification information registered in the database in association with the one or more pieces of second additional information is to be acquired.

* * * * *